March 31, 1970 C. L. COSHOW 3,503,570

SPINNING REEL DEPTH GAUGING MEANS

Filed April 22, 1968 4 Sheets-Sheet 1

INVENTOR
Chester L. Coshow

BY William S. Dorman

ATTORNEY

INVENTOR
Chester L. Coshow

BY *William S. Dorman*

ATTORNEY

March 31, 1970    C. L. COSHOW    3,503,570
SPINNING REEL DEPTH GAUGING MEANS
Filed April 22, 1968    4 Sheets-Sheet 3

CHESTER L. COSHOW
INVENTOR.

BY
William S. Dorman
ATTORNEY

March 31, 1970        C. L. COSHOW        3,503,570

SPINNING REEL DEPTH GAUGING MEANS

Filed April 22, 1968        4 Sheets-Sheet 4

CHESTER L. COSHOW
INVENTOR.

BY

William S. Dorman
ATTORNEY

United States Patent Office 3,503,570
Patented Mar. 31, 1970

3,503,570
SPINNING REEL DEPTH GAUGING MEANS
Chester L. Coshow, 223 S. 12th
Collinsville, Okla. 74021
Continuation-in-part of application Ser. No. 656,940,
July 28, 1967. This application Apr. 22, 1968, Ser.
No. 722,981
Int. Cl. A01k *89/00*
U.S. Cl. 242—84.2        7 Claims

ABSTRACT OF THE DISCLOSURE

A spinning reel including metering means for paying-out predetermined lengths of line, comprising, a stationary spool having a peripheral surface upon which line can be wound, a revolvable member adjacent to said spool, and a gauge member, the latter being movable between a first position removed from the region of said peripheral surface of said stationary spool and a second position spacedly superposed with respect to said peripheral surface, said gauge member being removably retainable in either said first or second positions, whereby when in said second position line wound about said stationary spool will be spaced above the peripheral surface of said spool in the region of said gauge member and supported by the latter in said region, the length of line subsequently payable from said spool when said gauge member is in the second position being limited to those line windings supported by said gauge member.

---

This application is a continuation-in-part application of my copending application Ser. No. 656,940 filed July 28, 1967 and entitled "Spinning Reel Depth-Gauging Means." This invention relates to fishing reels, casting reels, spinning reels and the like and more particularly to an improved spinning reel including metering means controlling the pay-out of predetermined lengths of line.

Whereas fishermen frequently find it desirable to fish at a certain depth, and to do so repeatedly each time the hook is dropped in a particular location, conventional spinning reels, incapable of conveniently and automatically being gauged for the specific depth required, have been found unsatisfactory. Further, anglers desiring to cast to predetermined distances and to repeatedly accomplish such measured casts have been frustrated to this end, especially when a readjustment of a previously gauged distance becomes necessary. Thus, the need for a spinning reel including means for readily adjusting the payable length of line after the desired length thereof has been determined will be well appreciated as a boon to any fisherman.

Accordingly, and consonant with the foregoing, the primary desideratum of the instant invention resides in the provision of a spinning reel having a memory, that is, structurally capable of being automatically set to the depth being fished whereby the hook, regardless of the number of times reeled in and re-dropped, will sink precisely to the originally gauged depth, readjustment of the setting or the absolute elimination of any setting being readily effectuated.

Another object of the present invention is to provide a spinnable reel of the foregoing character which exhibits the appearance of conventional spinning reels and which handles in substantially the same manner as such reels.

Another object of the instant invention resides in the provision of spinning reel depth-gauging means which is actuable from without the housing or casing of the spinning reel and which is easily manipulatable by the thumb of the user.

A further object of this invention resides in the provision of automatic line-metering means on a spinning reel comprising a stationary line-holding spool and a revolvable member including guide means functioning to wind the line about the stationary spool.

A still further object of the invention is to provide a device of the described character which will be simple in structure, economical of manufacture and highly effective in use.

Other objects and advantages of the instant spinning reel depth-gauging means will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate embodiments of the invention, and together with the description, serve to explain the principles of the invention.

Figure 1:
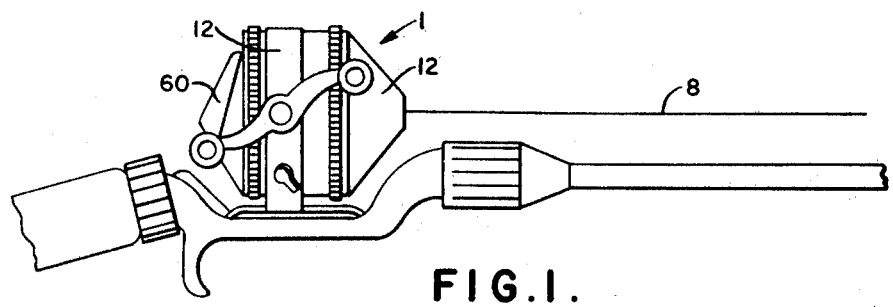
FIGURE 1 is a side elevational view illustrating the manner in which the present spinning reel is attached to a fishing rod.
Figure 2:
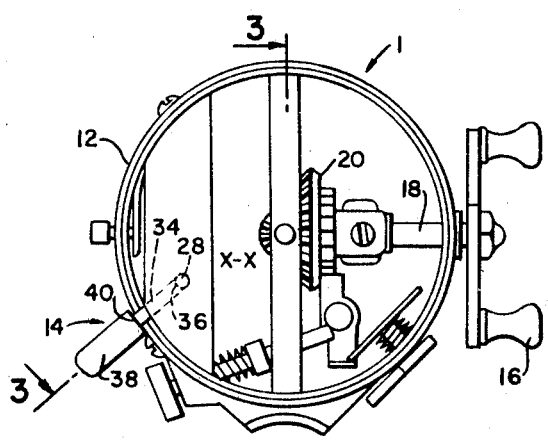
FIGURE 2 is a rear elevational view of the spinning reel with the rear portion of the housing or casing removed.

Referring now in detail to the present preferred embodiment of the invention illustrated in the accompanying drawings, FIGURES 1-5 show the spinning reel designated generally by numeral 1, said reel being comprised of a stationary spool 2 having a peripheral surface 4, a revolvable member 6 adjacent said spool, a line 8 at least partially wound upon the peripheral surface of said spool, guide means 10 provided surfacedly of said revolvable member, a housing or casing 12, and gauge means designated generally by numeral 14.

Figure 4:
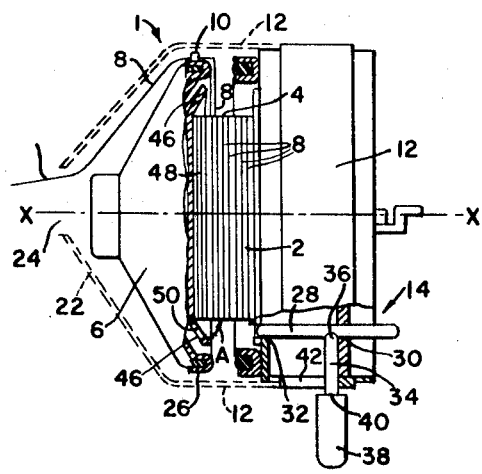
FIGURE 4 is a view in the nature of FIGURE 3 wherein, however, the gauge means is shown in inoperative position and a phantom of the housing covering the revolvable member is shown.
Figure 5:
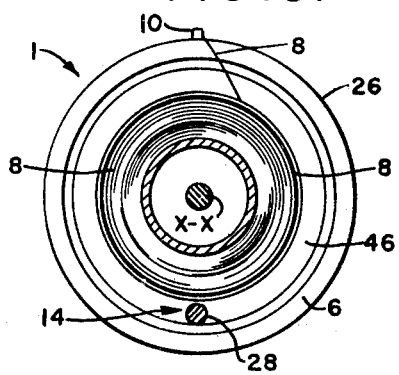
FIGURE 5 is a view taken along line 5—5 of FIGURE 3.

In the embodiment shown, said revolvable member 6 is in axial alignment with the central axis of said stationary spool 2, i.e., said revolvable member and stationary spool share a common axis X—X as illustrated in FIGURE 4 of the drawings. As a consequence of manually turning crank 16, said revolvable member 6, connected to said crank through shaft 18, bevel gear 20 and a corresponding meshing bevel gear (not shown) connected to shaft 18, will be caused to rotate, guide means 10 carried peripherally of said revolvable member being thus caused to rotate about axis X—X. Cover means 22, which forms a part of housing 12, and which encloses said revolvable member 6, guides said line 8 through passage 24 of said cover means, thereby causing said line 8 to slide contiguously across the periphery 26 of said revolvable member, as the latter is caused to rotate. Thus, upon rotation of said member 6, line 8 extending from said stationary spool 2, across the periphery of said revolvable member and through passage 24 of said cover means, is caused to wind about peripheral surface 4 of said stationary spool.

It will be appreciated that said guide means 10 may take other suitable forms, such as the scalloped edge to be described hereinbelow and illustrated in FIGURE 7 of the drawings, the essential purpose thereof being to slidingly snag the line thereby causing the line to wind about the stationary spool as the revolvable member is rotated.

Figure 3:
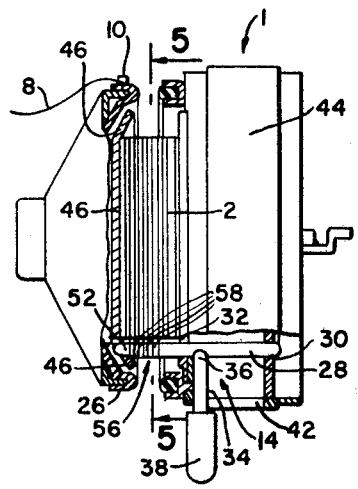
FIGURE 3 is a view taken along line 3—3 of FIGURE 2 showing the gauge means in operative position.

To the end of metering the length of line payable from said stationary spool, i.e., paying-out a predetermined line footage precisely equal in length to the depth fished previous to reeling in the line, the aforementioned gauge means 14 is provided. With particular reference now to FIGURES 3 and 4 of the drawings, said gauge means will be seen to comprise an elongate member 28 which is slidingly supported by apertures 30 and 32 in general parallelism with respect to the peripheral surface 4 of stationary spool 2. That is, as illustrated in FIGURE 4, said elongate member occupies a first position adjacent said peripheral surface and as observed in FIGURE 3, a second position spacedly superposed with respect to said peripheral surface, said gauge means being frictionally and removably retainable in either said first or second positions.

As will be further observed, said gauge means includes handle means, the latter being comprised of a shaft 34 connected at end 36 thereof to said elongate member 28, and a knob 38 connected at the other end 40 of said shaft, said shaft being slidably receivable within slot 42 provided through reel support member 44 and casing 12. Accordingly, movement of said handle means and thus elongate member 28 is readily effectuated from outside of said housing 12.

With further reference to the drawings, the spinning reel 1 will be seen to include a stationary flange portion 46 disposed adjacently of side 48 of the peripheral surface of said stationary spool, said flange forming an acute angle A with respect to said peripheral surface 4.

Opening 50 is provide through said flange portion 46, said opening being in alignment with the axis of movement of said elongate member 28. Accordingly, as illustrated in FIGURE 3, end 52 of said elongate member 28 is received within said opening 50 when said gauge means 14 occupies the aforesaid second position, said end 52, however, being disposed adjacently of the other side 54 of said peripheral surface when said gauge means 14 occupies said first position as observed in FIGURE 4.

Thus, as aforedescribed, and upon manual movement of knob 38, said gauge means is movable between the first and second positions and is removably retainable in either of said positions whereby when in said second position, line wound about said stationary spool 2 will be spaced above the peripheral surface 4 of said spool in the region 56 occupied by said gauge means and supported by elongate member 28 thereof in said region, the length of line subsequently payable from said spool while said elongate member continues to occupy said second position being limited to those windings, e.g., 58, supported by said elongate member. That is, after windings 58 are payed-out, further unwinding of line will be blocked by said elongate member continuing to occupy said second position.

In the operation of the present spinning reel, line 8 is permitted to be payed-out, generally under tension created by the weight of a sinker (not shown), to any desired fishing depth, such paying out being unmetered and being accomplished while gauge means 14 is in the aforedescribed first position. As in the case of most conventional spinning reels, a clutch mechanism is provided for the purpose of releasing the line in order to allow the latter to be payed-out as desired; further out-go of the line being precluded by manipulation of said clutch mechanism. Such line control is similarly afforded by depressing and releasing lever 60 of the instant spinning reel. Further description, however, of the mechanism has been omitted in view of the conventionality thereof.

After the line has been payed-out and partially reeled in whereby the desired fishing depth has been attained, fishing at such depth is continued until a fish is hooked, the bait is taken or for some other reason rendering it necessary to fully reel-in the line. Should the fisherman, however, in advance of fully or partially reeling in the line, decide that he wishes to again drop the line to precisely the depth at which he is presently fishing subsequent to the forthcoming reel-in, he will move knob 38 from the position shown in FIGURE 4 (first position) to the position shown in FIGURE 3 (second position). Henceforth, all line wound about stationary spool 2 will wind about elongate member 28 as well, and upon subsequent pay-out, after re-baiting, e.g., only line included or supported by said elongate member will be payed-out, said member acting as a stop precluding further pay-out of all windings other than those supported thereby. To permit further pay-out, however, to a greater depth, the fisherman must move knob 38 to the first position, whereby further blockage of line pay-out will be obviated.

Figure 6:
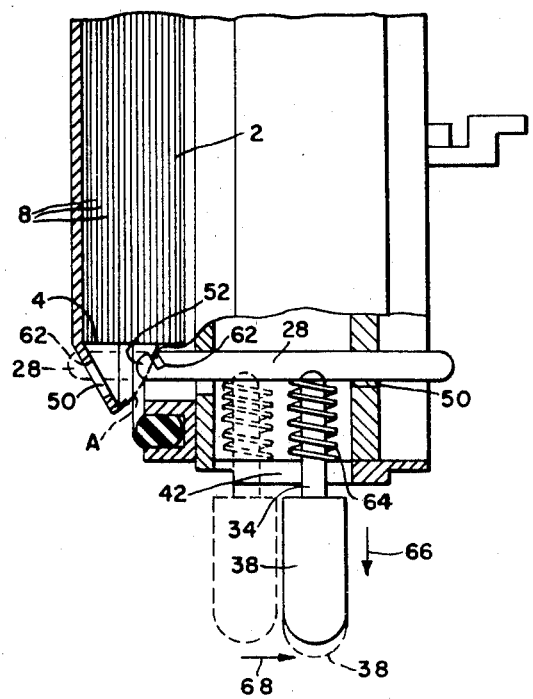
FIGURE 6 is a partially broken-away side elevational view showing a modified construction of the gauge means.

With reference now to FIGURE 6 wherein a modified gauge means construction is shown, like numerals are used to designate like parts shown in FIGURES 1-5. The modification is directed to the end of more positively retaining said elongate member 28 in the second position whereby the chances for inadvertent movement of said member from said second to the first position will be minimized. Specifically, elongate member 28 is provided with a notch 62 disposed inwardly of end 52 thereof, said notch being faced in the direction of peripheral surface 4 of stationary spool 2. Coil spring 64, disposed annularly of shaft 34 and intermediately of said elongate member 28 and slot 42, functions to normally urge said elongate member in the direction of said peripheral surface 4 of said stationary spool 2. Thus, as shown in broken line, said notch 62 will coact with said flange opening 50 to positively retain said elongate member within said opening when said member is moved to the second position. Disengagement of said notch and flange opening is readily accomplishable by pulling knob 38 in the direction of arrow 66 prior to pushing said knob in the direction of arrow 68 and thus to the first position. As shown, apertures 30 and 32 and opening 50 are sufficiently large to permit the aforedescribed inward and outward movement of said elongate member. Thus, by virtue of the placement of notch 62 opposite said peripheral surface 4, movement of said elongate member from the second to the first position will be permitted notwithstanding the possibility that line may be supported by said elongate member.

Figure 7:
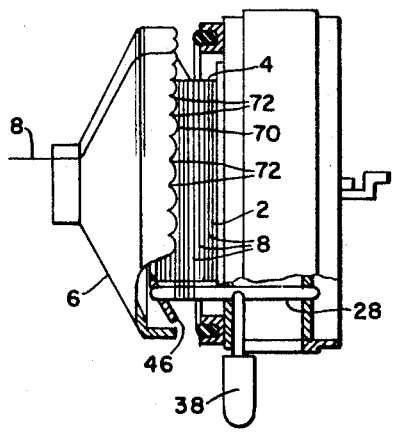
FIGURE 7 is a side elevational view of a modified spinning reel wherein the guide means on the revolvable member comprises the scalloped configuration shown.

Whereas, projection 10 constitutes the guide means utilized with the preferred embodiment for the purpose of effectuating the winding of line 8 about said stationary spool 2, FIGURE 7 illustrates the utilization of a scalloped edge 70 provided as shown on the revolvable member 6. In operation, line 8 will be snagged by any one of the troughs 72 upon rotation of member 6 in the aforedescribed manner to thereby cause said line to be wound about said spool 2. Of course, as stated, other suitable guide means as well fall within the contemplation of the present invention.

Referring now to FIGURES 8 through 13, a spinning reel generally indicated at 80 is shown which is of a type similar to the reel 1, and comprises a housing 82 having a normally stationary spool 84 and a relatively revolvable or rotatable member 86 disposed therein, as hereinbefore set forth. The line 8 is wound on the stationary spool 84 in the same manner as on the spool 2 and extends over the outer periphery of the rotatable member 86 in the same manner as described in relation to the rotatable member 6. The usual clutching mechanism 88 is provided for the reel 80 similar to the clutch 60 and for the same purpose. The spool 84 is usually separated from the gear members (not shown in FIGURES 8 through 13) by a transversely extending wall or partition 90, and the rear plate 92 of the spool 84 is preferably spaced slightly from the partitition 90 as clearly shown in FIGURES 9, 11 and 13. In addition, drag-means (not shown) is usually provided on the partition 90 and plate 92 for cooperating to permit a slight rotation of the spool 84 when the pull on the line 8 is substantially great, thus permitting the spool 84 to rotate before the line 8 breaks or snaps. This type of reel is substantially conventional and is a purchasable item, and further structural details are not deemed necessary for understanding of the invention, and thus will not be discussed herein.

A modified gauge generally indicated at 94 is disposed within the reel 80 and comprises an outer sleeve member 96 which extends through an aperture 98 provided in the partition 90. A collar member 100 is threadedly secured to the sleeve 96 and disposed adjacent the partition 90 oppositely disposed with respect to the plate 92. The flared outer end of the sleeve member 96 extends beyond the aperture 98 provided in the partition 90 for cooperating with the collar member 100 for retaining the sleeve 96 in position whereby the longitudinal axis sleeve 96 is in substantial axial alignment with the aperture 98.

A rod member 104 is slidably disposed within the sleeve 96 and a shank member 106 extends substantially perpendicularly from the rod 104 to provide a lever or handle for reciprocal movement of the rod 104 within the sleeve 96 as will be hereinafter set forth. The shank 106 may be threadedly secured to the rod 104 and extends outwardly therefrom through a longitudinally extending slot 108 provided in the sidewall of the sleeve 96. In addition, a longitudinally extending slot 110 is provided in the housing 82 for slidably receiving the lever or shank 106 therethrough for a purpose and as will be hereinafter set forth.

A suitable helical spring 112 is disposed around the sleeve 96 and is confined between the shank 106 and a cotter pin 114, or the like, extending transversely through the outer end of the sleeve 96. The spring 112 constantly urges the arm or shank 106 in a direction toward the partition 90, thus constantly urging the rod 104 in a direction toward the partition 90 for a purpose as will be hereinafter set forth.

Figure 9:
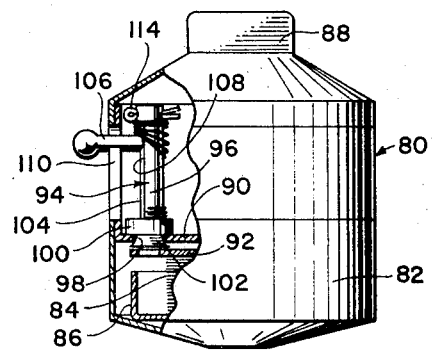
FIGURE 9 is an elevational view taken on line 9—9 of FIGURE 8, with portions thereof in section for purposes of illustration.
Figure 11:
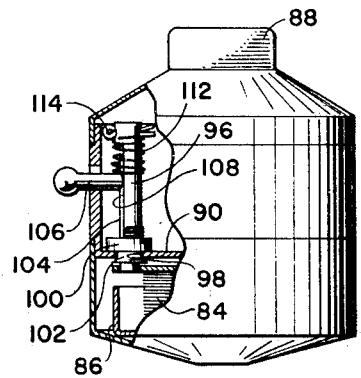
FIGURE 11 is an elevational view taken on line 11—11 in FIGURE 10 with portions thereof in section for purposes of illustration.
Figure 13:
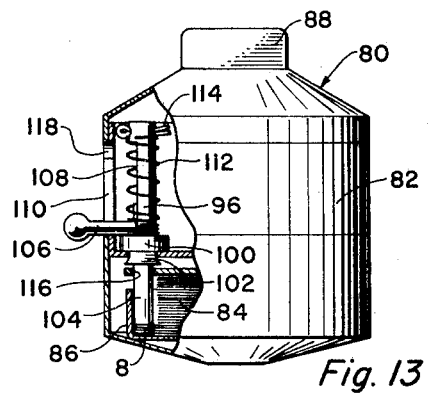
FIGURE 13 is an elevational view taken on line 13—13 of FIGURE 12 with portions thereof in section for purposes of illustration.

A plurality of circumferentially spaced apertures 116 are provided in the plate 90 of the spool 84. Only one of the apertures 116 is shown in FIGURES 9, 11 and 13. However, it is preferable to provide at least two of the apertures 116, with the apertures being spaced approximately 180 degrees apart. The radial spacing of each of the apertures 116 with respect to the center of the plate 92 is such that the apertures 116 may be individually aligned with the aperture 102 in the partition 90. The apertures 116 are also disposed radially outwardly with respect to the outer periphery of the spool 84 and the line 8 wound thereon, but radially inwardly of the inner periphery of the rotatable member 86. Thus the reciprocal rod 104 may be manually moved axially inwardly and outwardly with respect to the sleeve 96 by grasping the exposed end of the shank 106.

Figure 8:
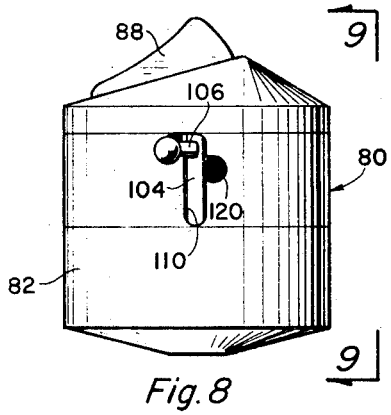
FIGURE 8 is a side elevational view of a spinning reel similar to that shown in FIGURES 1 through 7 with another modification of the gauge means provided thereon, and depicting one position for the gauge means.

A first position for the rod 104 is shown in FIGURES 8 and 9. In this position, the rod 104 is disposed in the most axially inward position with respect to the sleeve 96 and the spring 112 is compressed between the shank 106 and the pin 114. In addition, the shank 106 is positioned in the proximity of the upper closed end of the slot 110, as shown in the drawings. Of course, the spring 112 constantly urges the shank 106 and rod 104 in a dowward direction, as viewed in the drawings, and in order to hold the rod 104 in this first position, an offset recess 118 is provided in the housing 82 conterminous with the upper end of the slot 110 for receiving the shank 106 therein, as particularly shown in FIGURE 8. Thus, the rod 104 is positively retained in the said first position. In this first position, the rod 104 is retained completely out of engagement with any portion of the spool 84, and the reel 80 may be utilized in the normal manner with no interference from the gauge device 94. Thus, there will be no hampering of the drag action on the spool 84 when the line 8 becomes subjected to a relatively great pulling force.

Figure 10:
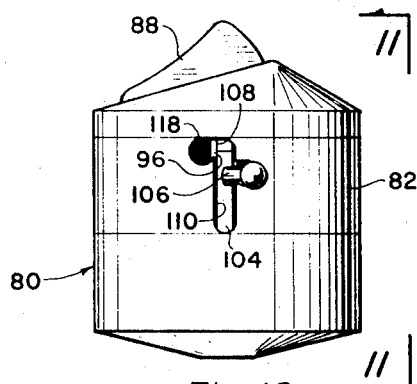
FIGURE 10 is a view similar to FIGURE 8 depicting a second position for the gauge means.

A second position for the rod 104 is shown in FIGURES 10 and 11. In this second position the rod 104 is moved longitudinally outward with respect to the sleeve 96 to a position wherein the outer or exposed end of the rod 104 engages one of the apertures 116 in the plate 92. It is important to note that the end of the rod does not extend beyond the plate 92, but just engages one of the apertures 116. In this position, rotation of the spool 84 is precluded, and the drag feature of the spool will not be operable. Of course, when the drag feature becomes necessary, the rod 104 may be returned to the first position as hereinbefore set forth. In order to retain the rod 104 in this second position, a second offset recess 120 is provided in the housing 82 conterminous with the slot 110 for receiving the shank 106 therein.

Of course, it is possible that the aperture 116 may not be in axial alignment with the aperture 98 when the rod 104 is moved toward the second position. If this occurs, the line 8 may be manually grasped and a relatively great force may be temporarily applied thereto by pulling on the line. This causes the spool 84 to rotate by virtue of the drag means, and as soon as one of the apertures 116 moves into alignment with the aperture 98, the rod 104 will be moved into the apertures 116 by the force of the spring 116. While the rod 104 is in the second position therefor, the reel 80 may be utilized in the normal manner for paying out the line 8.

Figure 12:
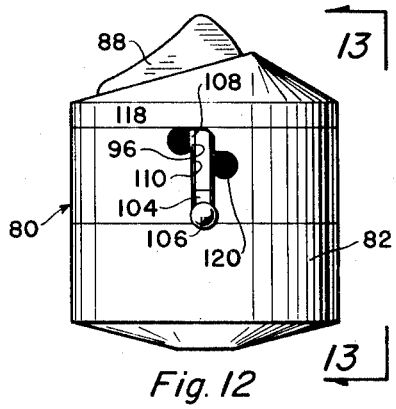
FIGURE 12 is a view similar to FIGURE 8 depicting a third position for the gauge means.

When the line 8 has been extended from the reel 80 a sufficient length to achieve the desired fishing depth, as hereinbefore set forth, the rod 104 may be moved fully extended or third position therefor, as shown in FIGURES 12 and 13. In the third position, the rod 104 is disposed substantially parallel with the outer periphery of the spool 84 and the line 8 wound thereon, and interposed between the spool 84 and the inner periphery of the revolvable member 86, as clearly shown in FIGURE 13. In addition, the shank 106 will be disposed in the proximity of the lower end of the slot 110 as viewed in FIGURE 12. The position of the rod 104 preclude any further paying out of the line 8 from the spool 84. When the line is reeled in or wound on the spool 84, the wraps of the line wind around the periphery of the spool 84 as usual, but also wind around the outer surface of the rod 104, as set forth in the preferred embodiment afore described. When the line 8 is again payed out, only that portion wound around the spool and rod 104 will be free to move from the reel 80, and thus, substantially the exact length of the line 8 will be payed out each time the reel is utilized.

Of course, when it is desired to change the length of the line 8 to be payed out for any reason, such as when changing locations for the fishing operation, the rod 104 may be moved to the second position, and the line 8 may be payed out in the usual manner to the newly determined length therefor. The rod 104 may be again moved to the third position for resetting the length of the line 8 to be payed out for subsequent fishing operations.

Figure 14:
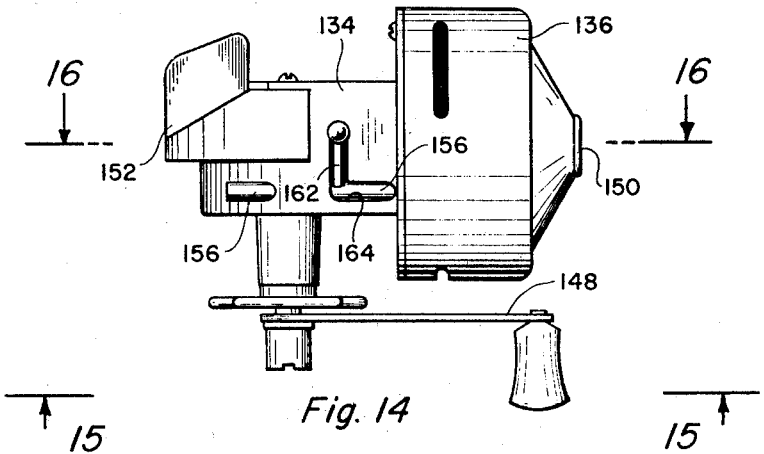
FIGURE 14 is a plan view of a spinning reel of a different type having the modified gauge means shown in FIGURES 8 through 13 disposed thereon.
Figure 15:
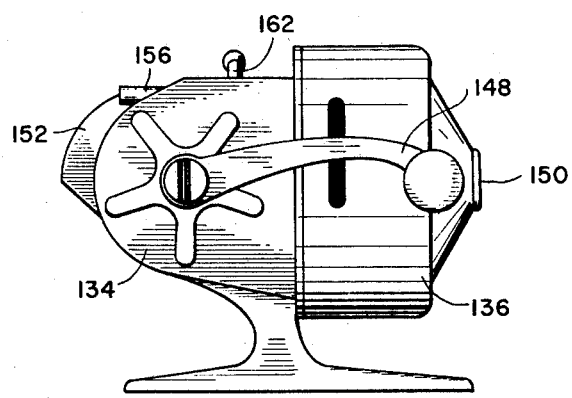
FIGURE 15 is a view taken on line 15—15 of FIGURE 14.
Figure 16:
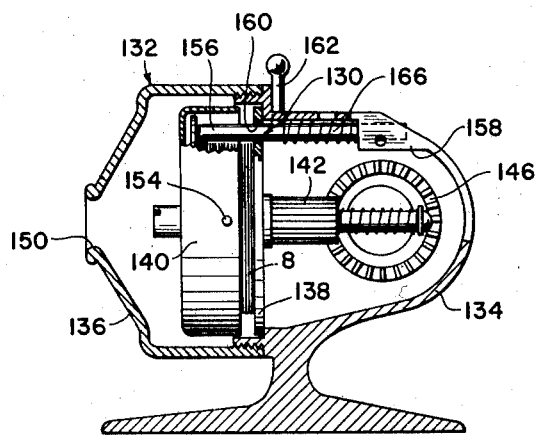
FIGURE 16 is a sectional view taken on line 16—16 of FIGURE 14.

Referring now to FIGURES 14 through 16, still another modification of the invention is illustrated. A gauge generally indicated at 130 is shown in combination with a slightly different type reel 132. The reel 132 is of the type generally sold under the trade name "Bear Cat" and comprises a first outer housing 134 having a second outer housing section 136 threadedly secured thereto. A stationary spool 138 is suitably secured to the housing 134 and extends axially into the housing 136, as particularly shown in FIGURE 16. A revolvable member 140 is disposed within the housing 136 and partially around the spool 138. The revolvable member 140 is suitably connected with a pair of complementary gears 142 and 146 which are driven by a suitable crank arm 148 as is well known. The line 8 is wound on the spool 138 in the same manner as hereinbefore set forth and extends over the outer periphery of the rotatable member 140 and out the central aperture 150 of the housing 136 in the usual manner. A suitable trigger or clutching mechanism 152 is provided for holding the member 140 against rotation during the paying out of the line 8, as is well known. An outwardly extending pin or lug 154 is provided on the outer periphery of the member 140 for engaging the line 8 during the reeling in of the line, as is well known.

The gauge device 130 comprises a rod member 156 having one end thereof slidably disposed in an apertured boss 158 in the housing 134, and the opposite end thereof slidably extending through an aperture 160 provided in the reel 138. A shank member 162 is threaded or otherwise suitably secured to the rod 156 and extends substantially perpendicularly outwardly therefrom through a substantially L-shaped slot 164. The shank member 162 provides a lever or handle for facilitating the reciprocal movement of the rod 156 as will be hereinafter set forth. A suitable helical spring 166 is disposed around the rod 156 and is confined between the shank 162 and the boss 158 for constantly urging the rod 156 in a direction toward the spool 138 and revolvable member 140.

A first position may be provided for the rod 156 by manually moving the lever 162 against the action or force of the spring 166 thereby moving the rod 156 in a direction away from the movable member 140. In order to retain the rod 156 in this first position, the lever 162 may be positioned in the offset portion of the L-shaped slot 164. In this position, the outer end of the rod 156 will protrude beyond the outer periphery of the housing 134 as shown in FIGURES 14 and 15. It is to be noted that the shaft or rod 156 is sufficiently long to assure engagement with both the apertured boss 158 and the aperture 160 in all positions of the rod, thus assuring an efficient support for the rod within the reel 132.

With the rod 156 in this first position therefor, the reel 132 may be utilized in the normal manner for paying out the line 8. When the desired length of line 8 has been unreeled from the spool 138, the rod 156 may be moved to the second position therefor as shown in FIGURE 16. In the second position for the rod 156, the rod is positioned substantially parallel with the outer periphery of the spool 138 and interposed between the spool and the inner periphery of the rotatable member 140. As soon as the rod 156 is in this position, further unreeling of the line 8 is precluded. Of course, the rod 156 is retained in this position by the action of the spring 166. When the line 8 is reeled in in the usual manner, the line will wind around the spool and the rod 156, and when the line is again payed out, only that portion which has wound around the spool and the rod will be extended from the reel 130, thus assuring substantially the same length of exposed line each subsequent time.

Of course, when it is desired to change the overall length of the line 8 to be payed out, the rod 156 may be withdrawn into the first position therefor, and the line 8 may be payed out again in the usual manner until the newly established length is reached. The rod 156 may then be reset to the second position therefor, and the same length of line will be assured for each subsequent casting operation for the reel 132.

Of course, it will be apparent that the present invention relates to a means for controlling the length of a line being cast from a spinning reel, or the like, wherein repeated casting operations will result in substantially an identical length of line being payed out. The embodiments of the invention depicted herein are all disposed internally of the reel but it is to be understood that an external arrangement may also be provided for accomplishing the same result. For example, an auxiliary reel (not shown) having a negator spring, or the like, may be carried on the outer periphery of the reel housing whereby the length of the line which is payed out may be reeled onto the auxiliary reel rather than onto the stationary spool. Thus, each time the line is cast, only that portion of the line on the auxiliary reel will be payed out.

From the foregoing it will be apparent that the present invention provides a novel gauge means for controlling the payout line from a spinning reel, or the like, whereby substantially the exact length of the line may be cast from the reel at each subsequent casting operation. The novel gauging means comprises a slidable rod member which may be readily moved to a position for establishing the length of the line for the subsequent casting operations, and may be readily retracted to a position permitting normal use of the reel for altering the length of the line, as desired. The novel gauge means may be utilized with substantially any type of spinning reel, and is simple and efficient in operation and economical and durable in construction.

Changes may be made in the combination and arrangement of parts as heretofore set forth in the specifications and shown in the drawings, it being understood that any modification in the precise embodiment of the invention may be made within the scope of the following claims, without departing from the spirit of the invention.

What is claimed is:

1. In combination with a spinning reel having a stationary spool and a relatively revolvable member co-operating to provide for reeling and unreeling of a line, gauge means carried by the reel and comprising a reciprocal rod member movable between first and second positions, said first position being a disengagaed position with respect to the stationary spool whereby the reel may be utilized in a normal manner, said second position being adjacent the outer periphery of the stationary spool for precluding further unreeling of the line and establishing a substantial constant length of the line for subsequent unreeling and reeling operations, and means cooperating with the rod for constantly urging the rod in a direction toward said second position.

2. In combination with a spinning reel, gauge means as set forth in claim 1 wherein said reciprocal rod member is movable to first, second and third positions; in said first position the rod is completely disengaged from the stationary spool; in said second position said rod engages said spool; and in said third position the rod is positioned substantial parallel with and adjacent to the outer periphery of the spool for control of the length of the line being unreeled and reeled therefrom.

3. In combination with a spinning reel, gauge means as set forth in claim 1 wherein lever means is provided on said rod for facilitating manual operation thereof.

4. In combination with a spinning reel, gauge means as set forth in claim 3 wherein said reel is provided with slot means cooperating with said lever means for positively retaining said rod in said positions.

5. In combination with a spinning reel, gauge means as set forth in claim 1 wherein said last mentioned means comprises a spring member disposed around said rod member for maintaining said rod member in said positions.

6. In combination with a spinning reel having a stationary spool for supporting a line wound thereon and a revolvable member cooperating with the stationary spool for reeling the line onto the spool, gauge means carried by the spinning reel and comprising a rod member slidably secured within the reel, said rod being disposed substantially parallel with the axis of the spool and spaced slightly from the outer periphery thereof, lever means carried by the rod and extending outwardly therefrom and beyond the confines of the reel for facilitating manual reciprocation of the rod, spring means disposed around the rod and cooperating between the reel and the lever for constantly urging the rod in one direction, said rod being movable against the action of the spring to a first position whereby the rod is displaced with respect to the outer periphery of the spool, said rod being movable to a second position whereby the rod is disposed adjacent to the outer periphery of the spool for controlling the length of the line to be reeled and unreeled from the spool, and said lever cooperating with said reel and spring for positively retaining the rod in the said positions therefor.

7. In combination with a spinning reel, a gauge means as set forth in claim 6 wherein said rod is reciprocally supported in a slotted sleeve member, said sleeve member being rigidly secured within said reel, said lever member extending through the slotted sleeve and beyond the confines of the reel, said spring member being disposed around said sleeve member and bearing against said lever member for urging the rod in said one direction.

References Cited

UNITED STATES PATENTS

| | | | |
|---|---|---|---|
| 184,663 | 11/1876 | Reichert | 242—107.2 |
| 2,367,214 | 1/1945 | Hedge | 242—96 XR |
| 2,656,992 | 10/1953 | Keates | 242—84.2 |
| 2,668,025 | 2/1954 | Hull | 242—84.2 |
| 3,085,765 | 4/1963 | Ulrich | 242—84.1 |
| 3,176,929 | 4/1965 | Britt | 242—84.1 |
| 3,259,333 | 7/1966 | Hull | 242—84.2 |

BILLY S. TAYLOR, Primary Examiner

UNITED STATES PATENT AND TRADEMARK OFFICE
Certificate

Patent No. 3,503,570　　　　　　　　　　　　Patented March 31, 1970

Chester L. Coshow

Application having been made by Chester L. Coshow, the inventor named in the patent above identified, and Stanco Corporation, a corporation of Oklahoma, the assignee, for the issuance of a certificate under the provisions of Title 35, Section 256, of the United States Code, adding the name of Ray Holmes as a joint inventor, and a showing and proof of facts satisfying the requirements of the said section having been submitted, it is this 1st day of April 1975, certified that the name of Ray Holmes is hereby added to the said patent as a joint inventor with the said Chester L. Coshow.

FRED W. SHERLING,
*Associate Solicitor.*